(No Model.) 4 Sheets—Sheet 4.
H. RONGIER.
MANUFACTURE OF WELDLESS CHAINS.
No. 413,764. Patented Oct. 29, 1889.
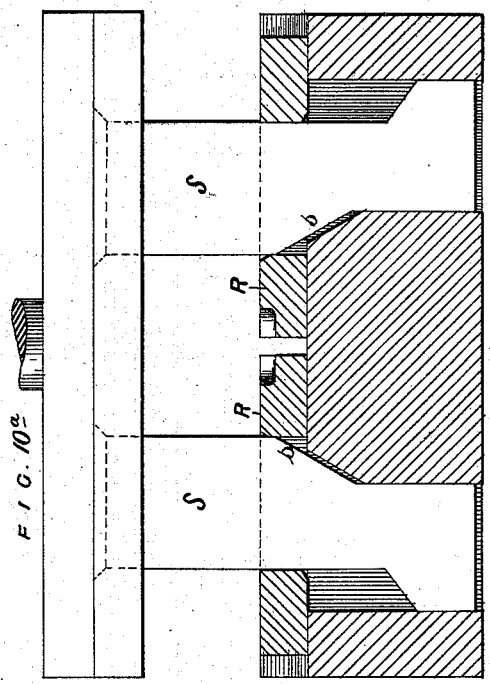
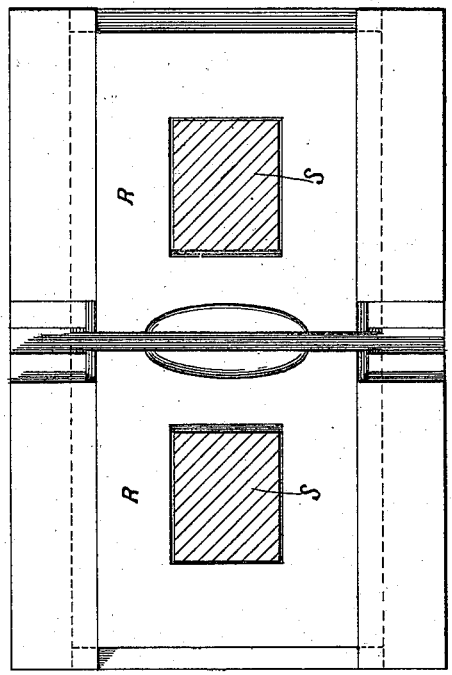
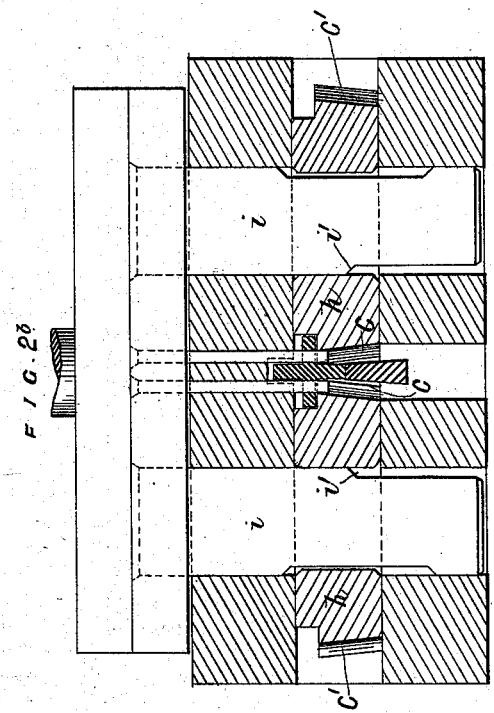
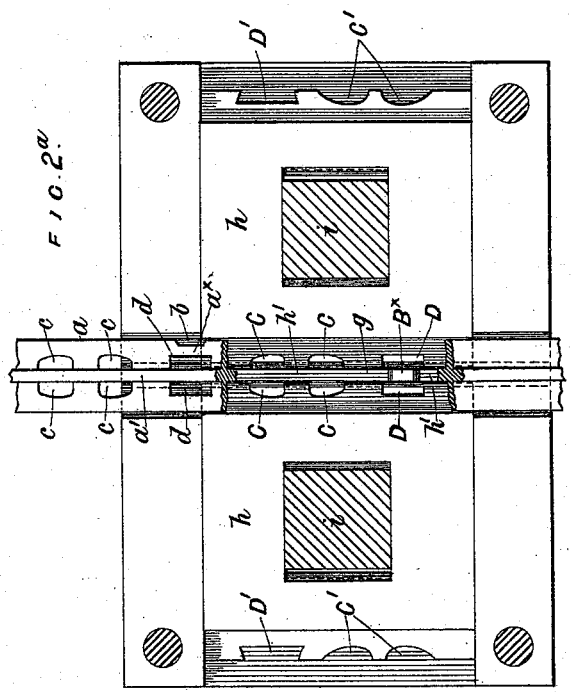
WITNESSES:
INVENTOR.
Hippolyte Rongier
BY Briesen, Steele & Knauth
ATTORNEYS United States Patent Office.

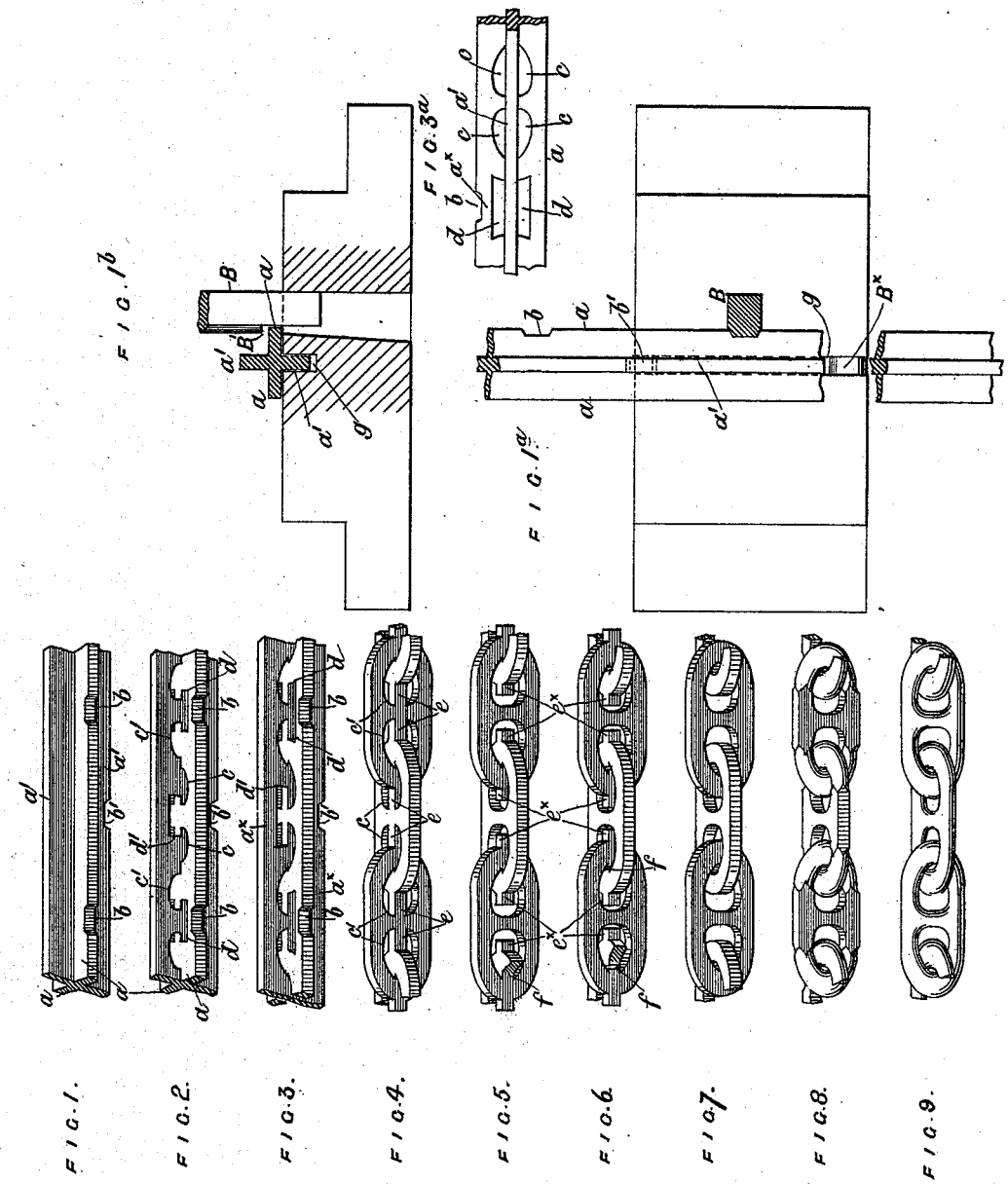

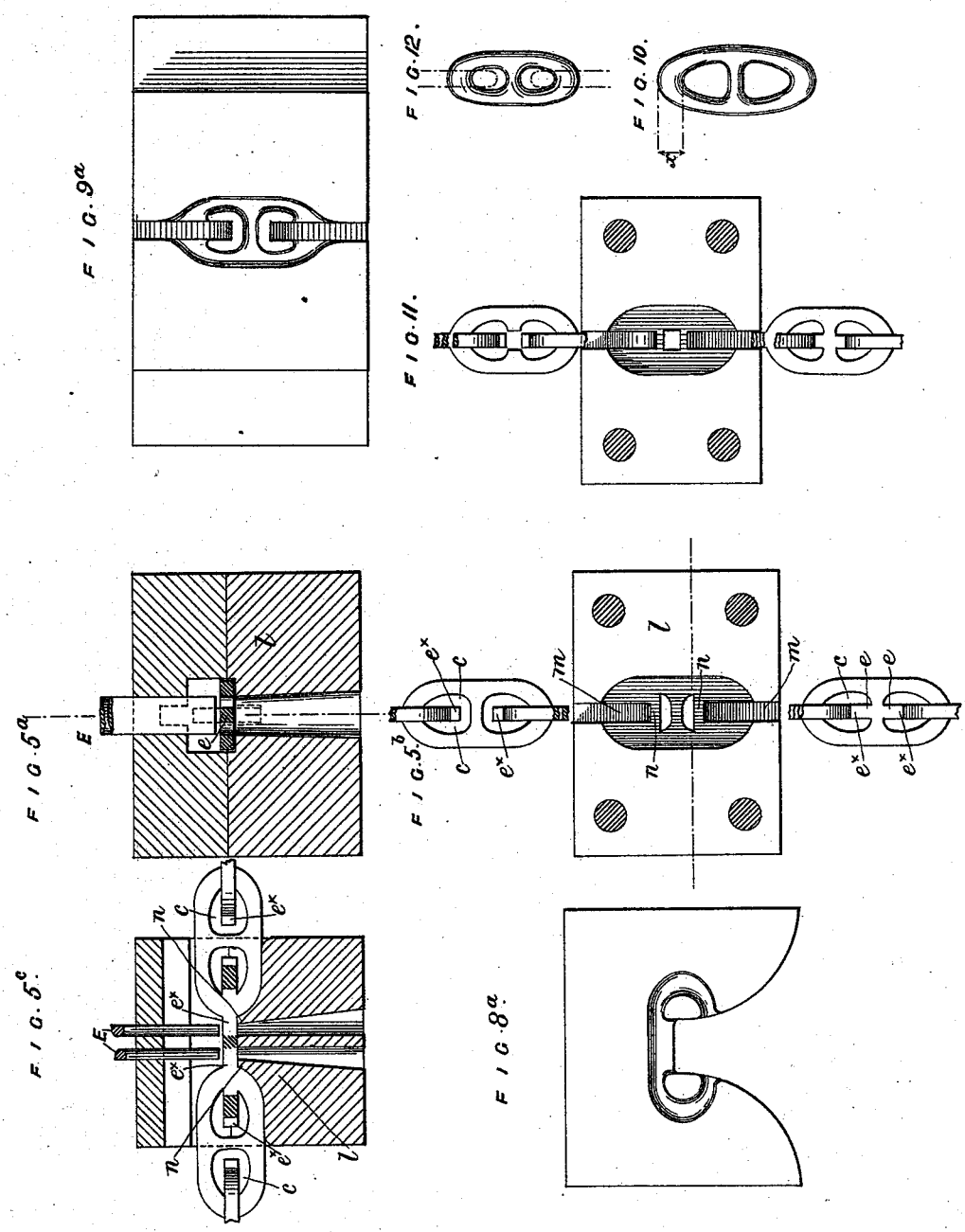

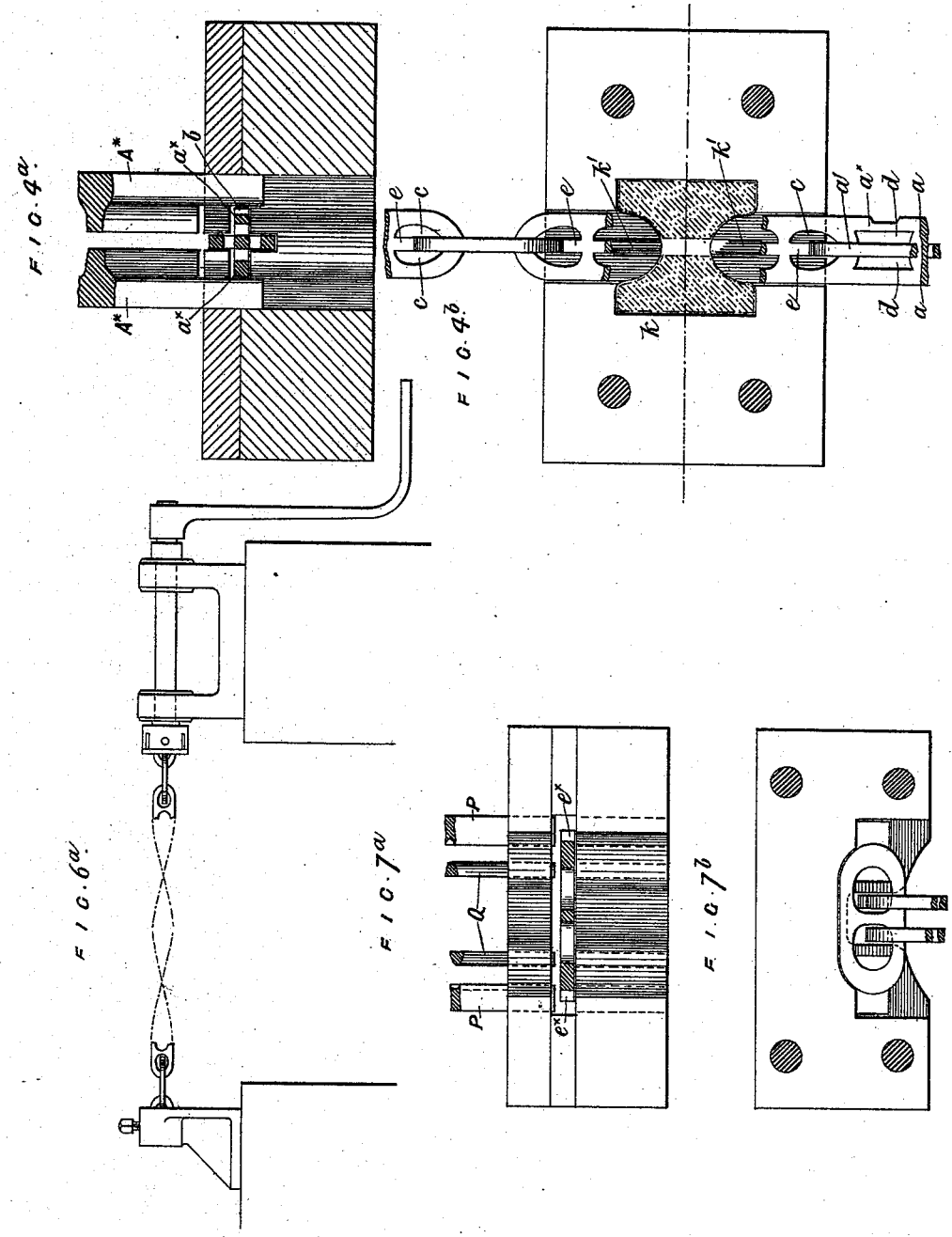

HIPPOLYTE RONGIER, OF BIRMINGHAM, COUNTY OF WARWICK, ENGLAND.

MANUFACTURE OF WELDLESS CHAINS.

SPECIFICATION forming part of Letters Patent No. 413,764, dated October 29, 1889.

Application filed August 22, 1889. Serial No. 321,656. (No model.)

*To all whom it may concern:*

Be it known that I, HIPPOLYTE RONGIER, engineer, of 18 Bath Row, Birmingham, in the county of Warwick, England, have invented certain new and useful Improvements in the Manufacture of Weldless Chains, of which the following is a specification.

My invention has for its object the manufacture of weldless stayed chains, whereof each link, together with its cross strut or stay, is made of one piece of metal without any weld or joint; and the invention consists in producing a chain of stayed links from a bar of cruciform section by the consecutive series of punching, twisting, and stamping operations hereinafter described, the punching operations being entirely performed on the metal when in the cold state.

My present invention is in certain respects similar to that described in a previous application for British Letters Patent made by me on the 29th day of May, 1888, No. 7,835, my said former invention also having for its object the manufacture of weldless chains, but of ordinary unstayed links, whereas the present improvements are particularly designed for and are limited to the manufacture of weldless chains of stayed links.

I am aware that it has also been proposed by others to make weldless chains from the bar of cruciform section by punching and squeezing operations; but no practical and efficient method of accomplishing this result by punching out the metal in the cold has been devised except by myself. In this connection I would particularly point out that the comparatively simple operations of punching or notching the edges of the webs in the flat for the purpose of giving the external contour to the links, as heretofore proposed to be accomplished, has been such as to weaken the bar transversely to such an extent that when the operation of punching out the insides of the links is performed the bar could not resist the pressure of the tools, but would necessarily become bent and crippled to such an extent that the work would be so defective as to be practically useless.

Reference is to be had to the accompanying drawings, forming part of this specification, wherein I have represented the consecutive stages of manufacture of the stayed chain throughout, and also the tools successively employed in such manufacture.

Figures 1 to 10 show the progressive stages in the manufacture of the chain, and the remaining figures show the series of tools that are employed.

The general method of operation of making stayed chains according to my invention is so far similar to the methods heretofore proposed for making unstayed chains from the bar of cruciform section that the links are formed alternately out of the one and the other pair of diametrically-opposite webs of the rod, the links, when severed and completed, being already enchained together at the time of their formation. The successive operations differ, however, in many important practical respects from those heretofore proposed, as will appear from the following detailed description of the successive steps in the process illustrated by Figs. 1 to 10.

I will distinguish the one pair of diametrically-opposite webs of the bar and the notches and mortises punched therein and the links formed therefrom from the other pair by an index-figure 1 affixed to the reference-letters appertaining thereto.

$a$ $a$ are one pair of diametrically-opposite webs, and $a'$ $a'$ the other pair of webs of the bar.

The first operation illustrated in Fig. 1 is to punch out of the edge of one of the webs $a$ a series of shallow notches $b$ at equal intervals apart, corresponding to the pitch of the links to be formed out of that pair of webs and situated where the spaces will ultimately be formed between the ends of that series of links. The notches are made with beveled ends, and are no deeper than is absolutely necessary, (for the purpose of a guide-stop in the subsequent operations, as hereinafter described,) so as to avoid, as far as possible, weakening the bar transversely. This operation is repeated upon one of the pairs of webs $a'$; but whereas in the first operation of notching the web the "pitch" of the notches is determined by the feed mechanism, in this second operation of notching the notches $b$ cut in the web $a$ serve as guides to influence and compensate for any inaccuracy of the feed mechanism, so that the second set of notches $b'$ shall be intermediate of and rigorously equidistant from the first set of notches $b$. This compensation is effected by the notches $b$ fitting onto a beveled stop on the bed of the punching-tool by which the notches $b'$ are cut, the beveled ends of the notches $b$ causing the bar under the pressure of the punch to adjust itself in the longitudinal direction (if necessary) sufficiently to rectify any inaccuracy of feed. These notches $b\ b'$ similarly serve as guides to insure uniformity of spacing in the subsequent operations of punching out the links.

The second operation (illustrated in Fig. 2) is to punch out of the pair of opposite webs $a\ a$ pairs of oblong mortises—two pairs $c\ c$ and one pair $d\ d$. These three pairs of mortises (which might be punched at separate operations, but are preferably punched at one stroke of the press) are situated as close as possible up to the faces of the other pairs of webs $a'\ a'$, the pairs of mortises $c\ c$ being so spaced as to correspond in position to the eyes of the links to be formed, to which they correspond approximately in form, while the pair $d$ correspond in position to the notches $b$, and therefore to the intervals by which the links formed out of the same pair of webs $a\ a$ will be separated when completed. This operation is continued along the whole length of the pair of webs $a$. It will be observed that a considerable thickness of metal is left at $a^*$ between the notches $b$ and the mortises $d$. This is of primary importance and is one of the essential features of my method of manufacture, inasmuch as by first punching out the mortises $d$ the subsequent removal of the metal from between the outer ends of the links is greatly facilitated, while by leaving the solid metal $a^*$ the transverse strength of the webs $a\ a$ is not materially diminished, so that when the operation of punching the mortises $c$ and $d$ in the other pair of webs $a'$ is performed the bar will not be bent and crippled, as would inevitably be the case were the whole of the metal opposite the notches $b$, which is ultimately to be removed, to be punched out at so early a stage of the manufacture. The operation of punching the pairs of mortises $c'$ and $d'$ having been repeated along the other pair of webs $a'$, it will be observed that like the notches $b$ the mortises $c\ d$ in the one pair of webs alternate with those $c'\ d'$ in the other pair of webs.

The third operation (illustrated in Fig. 3) is to elongate the mortises $c\ d$ and bring the mortises $c\ c'$ more nearly to the final form. This is performed by punches similar to but larger (in the direction of the length of the rod) than those used in the second operation.

The third operation, which is repeated upon both pairs of webs $a\ a\ a'\ a'$, may be considered as a second stage of the second operation, it being preferable to punch out the mortises in two stages in order to remove sufficient metal without unduly straining the bar.

The fourth operation (illustrated in Fig. 4) consists in roughly shaping the ends of the links externally by punching out the portions $a^*$ of the webs $a$ between the links lying in the same plane or formed out of the same pair of webs. This operation is repeated on the other pair of webs $a'$. Up to this point a continuous core of metal has been left at the intersection of the two pairs of webs.

The fifth operation (illustrated in Fig. 5) consists in punching out the portions $e$ of the core at each side of the cross-stay of the link, so as to separate the cross-stay from the outer ends of the adjacent links. This operation is performed by removing a portion only of the metal of the core which intervenes between the cross-stay and the outer ends of the adjacent links enchained with the link under operation—that is to say, portions $e^*$ of the core are temporarily left attached to the outer ends of the links in order to avoid crippling or bending the bar, which might occur were the whole of this metal, which is ultimately to be removed, to be punched out at once, these portions $e^*$ being supported by the beddie in the operation of punching out the spaces $e$, as hereinafter described. This operation having been repeated upon both pairs of webs, it will be observed that the rod-like form of the chain is now only maintained by the portion of the core at the points $f$, where the inner side of the eye or bow of one link is united with that of the next one. The severing of these intervening portions of the core and the breaking up of the rod into the constituent links of the chain constitute the sixth operation.

The sixth operation (illustrated in Fig. 6) is performed by torsion, and for this purpose one end of the rod is held fixed, while the other is twisted once or twice in opposite directions until by fatigue of the metal at the points $f$ the whole of the links are severed almost at the same instant, and a chain of roughly-formed stayed links is produced.

The seventh operation (illustrated in Fig. 7) is to remove the superfluous projecting pieces of metal both from the inside and outside of the ends of the links. For this purpose the two ends of each link are operated on at the same time by two pairs of punches corresponding to the outline of the ends of the link.

The eighth operation (illustrated in Fig. 8) is to bring the ends of the links to their finished rounded form. This is performed by stamping both ends of each link at the same time between pairs of shaping dies or swages.

The ninth operation (illustrated in Fig. 9) is to bring the middle portion of each link—that is to say, the side members and the cross-stay—to the finished rounded form, which is also performed by means of a pair of dies or swages.

The tenth and last operation (illustrated in Fig. 10) is to contract the link slightly in the lateral direction in order to correct any imperfections at the sides left by the two previous operations and bring the link to a more perfect and stronger form, as shown. This operation has the important result of strengthening the link considerably by contracting or rendering more pointed the arched form of the bow or end of the link, and also by thickening the metal at that part where the wear is greatest, this thickening of the metal at the ends of the link occurring in the direction of the line of strain (as indicated by $x$ in Fig. 10) and being brought about by the compression or "upsetting" of the metal at the end of the link. It may be preferable to perform this operation immediately after the seventh operation, and I reserve the right to do so.

In the case of large cables only the metal is preferably heated for the eighth, ninth, and tenth operations.

I will now refer to the figures which illustrate the series of tools whereby the above-mentioned operations are performed.

Fig. $1^a$ shows a plan, (the punch being in section,) and Fig. $1^b$ an elevation, of the bed-die of the tool by which the notches $b$ of the first operation are performed. The feed mechanism is not shown, but might be of any ordinary intermittent kind. $g$ is a groove in the bed, in which lies the lower vertical web of the rod, of cruciform section, the two horizontal webs lying upon the bed with the edge of the web to be notched lying just over the die, in which works the punch B, of which $B'$ is the cutting-edge. The punch is operated in the usual way, its lower end, which does not rise out of the die, acting as a guide. $B^*$ is the beveled stop in the groove $g$, which by fitting in the notches $b$ or $b'$ corrects inaccuracies of the feed.

Fig. $2^a$ is a sectional plan, and Fig. $2^b$ an elevation, of the tool by which the second operation is performed, the same tool being also used for performing the third operation. (Illustrated in Fig. $3^a$.) $h$ $h$ are a pair of bed-dies having a space $h'$ between them to receive the lower web of the bar, and having notches C C and D D in their inner ends, forming counterparts of the punches by which the pairs of mortises $c$ $d$, Fig. 2, are punched in the pair of webs lying upon the bed-dies $h$. These bed-dies are fitted to slide a little in opposite directions upon a suitable bed-plate and are caused by the inclined cams $i'$ on the guides $i$ of the press-head (which pass through corresponding apertures in the bed-dies $h$) to approach each other at the moment the punches come down on the work, so as to grip the lower web of the rod and support the pair of webs being operated on close up to the sides of the lower web lying in the space $h'$, while when the punches rise the bed-dies move apart, so that the web is quite free in said space $h'$ and the rod may be easily fed forward for a fresh stroke of the press. $B^*$ is the beveled stop in the space $k'$, as in the tool first described. The bed-dies $h$ have a second set of notches $C'$ $D'$ at their outer ends, similar to but longer than those C D, so that by reversing the bed-dies they will form counterparts for a second set of punches corresponding thereto for performing the third operation—i. e., enlarging the mortises $c$ $d$, as represented in Figs. 3 and $3^a$; or, instead of adapting the dies $h$ to perform the two operations, separate tools may be used for the second and third operations.

Fig. $4^a$ is an elevation, and Fig. $4^b$ a sectional plan, of the tool for performing the fourth operation—namely, removing the portion $a^*$, Figs. 3, $3^a$, $4^a$, and $4^b$. This is done by a pair of punches $A^*$, corresponding in shape to the ends of the link in the rough and to the aperture shown in the bed-die $k$, Fig. $4^b$, which has a groove $k'$ to admit the lower web of and to guide the rod. The beveled stop $B^*$, used in operating on the pair of webs $a$, corresponds to the notches $b'$; but in operating on the webs $a'$ the stop must be replaced by one corresponding to the aperture left by the removal of the portion $a^*$.

Fig. $5^a$ is an elevation, Fig. $5^b$ a plan, and Fig. $5^c$ a longitudinal vertical section, of the tool for performing the fifth operation, the work being shown in section in the latter figure. It consists of a bed-die $l$, with groove $m$ to receive the lower web, but terminating at a distance from the die-apertures, so as to leave supports $n$ for the parts $e^*$ of the rod to resist the downward pressure of the punches E, which remove the portions $e$ from each side of the cross-stay, as shown in Figs. $5^b$ and $5^c$. The correct position of the work in regard to the punches is insured by these supporting parts $n$, which terminate the grooves $m$.

Fig. $6^a$ is an elevation of the winch for performing the sixth operation.

Fig. $7^a$ is an elevation, and Fig. $7^b$ a plan, of the tool for performing the seventh operation. P P are the punches for trimming the outside, and Q Q those for trimming the inside of the ends of the links. The links adjacent to the one to be operated on are brought together into the position shown in dotted lines, the bed-die having an aperture in it to admit of this, so that both ends of the link to be trimmed may be operated on together.

The tool for performing the eighth operation consists of a pair of swages, the bottom one only being shown in Fig. $8^a$. The swages correspond to the intended rounded sectional form of the ends of the link, which is placed in position between the swages in a similar manner to that described for Fig. $7^b$, so that both ends are rounded or finished off at once.

Fig. $9^a$ is a plan of the bottom swage of the tool for performing the ninth operation, the upper swage corresponding thereto at least in so far as the middle part of the link to be operated on is concerned.

The tool for performing the tenth operation is represented in elevation and plan in Figs. $10^a$ and $10^b$. It consists of a pair of bed-dies R, fitted to slide together and operated by the cams $s$ on the guide-rods S, the operation being similar to that of the tool shown in Figs.

2ª and 2ᵇ, except that there are no punches, and that the link which lies in the cavity of the dies is merely compressed in the lateral direction by the inward motion of the bed-dies.

My invention further comprises a modification of the above-described process, which has for its object to enable the weldless stayed links to be made as short and particularly as narrow as may be necessary in order to adapt the chain to run over the sheaves of pulley-blocks and to suit other purposes for which short-link welded chain has heretofore only been available.

In the manufacture of chains by the aforesaid process of punching there is a practical minimum limit for the dimensions of the punches which cannot be reduced without compromising their efficiency, and consequently the width (and therefore the length) of the link must necessarily bear a certain proportion to the thickness of the web of metal out of which it is formed, since the breadth of the link depends on the length of the cross-stay, which is determined by the breadth of the mortises forming the eyes of the link. The present modification enables these dimensions to be reduced without reducing the dimensions, and consequently the efficiency, of the punches which form the eyes of the link. The modification applies to what I have designated the fifth operation of the above-described process; and it consists in punching out the middle of the cross-stay, (so as to leave only two short stumps jutting inward from the side members of the link,) this operation serving to interrupt the continuity of the core, which was the object of the fifth operation. For this purpose I substitute for the pair of punches illustrated in Figs. 5ª and 5ᶜ a single punch, which removes that part of the "core" of the cruciform bar which is situated at the middle of the strut. This tool is represented in Fig. 11, and the effect of its operation is shown in Fig. 12. The subsequent operations, herein designated the sixth, seventh, eighth, and ninth operations, are performed as hereinbefore described; but the tenth operation has the effect of closing together the two stumps g g until they abut together at the middle of the link and together constitute a cross strut or stay, which prevents any further lateral collapse of the link. In the operation of closing up the gap between the stumps g g the link is brought to the narrow form shown in Fig. 12, the eyes of the links being only just wide enough to receive the end of the adjacent link enchained therewith without gripping it. This operation is performed by a tool similar to that shown in Figs. 10ª and 10ᵇ, above referred to.

Having now particularly described and ascertained the nature of my said invention and in what manner the same is to be performed, I declare that what I claim is—

1. The manufacture of weldless chains of stayed links by the consecutive series of punching, twisting, and stamping operations, substantially as herein described.

2. In the process of manufacturing weldless stayed chains from a bar of cruciform section, the step in the process which consists in punching out (whether in one or two operations) pairs of mortises corresponding in position to the intervals to be formed between the outer ends of the same series of links, said step being so performed as to prepare the webs for the ultimate operation of removing the metal at these points, and yet leave the metal so disposed as to maintain the transverse stiffness of the bar during the repetition of the same operation on the other pair of webs, as described.

3. In the process of manufacturing weldless stayed chains from a bar of cruciform section, the combination or series of steps herein designated as the second, third, and fourth operations, as described.

4. In the process of manufacturing weldless stayed chains from a bar of cruciform section, the combination or series of steps herein designated as the second, third, fourth, and fifth operations, as described.

5. In the process of manufacturing weldless stayed chains from a bar of cruciform section, the combination or series of punching and twisting operations herein designated as the second, third, fourth, fifth, and sixth operations, as specified.

6. In the process of manufacturing weldless stayed chains from a bar of cruciform section, the combination or series of steps herein designated as the fifth, sixth, and seventh operations, as specified.

7. In the process of manufacturing weldless stayed chains from a bar of cruciform section, the step which consists in compressing the bows of each link laterally in such a way as to cause the ends of the links to become thickened in the direction of the line of strain and of wear by the upsetting or compression of the metal at these points, as described.

8. In the process of manufacturing weldless stayed chains from a bar of cruciform section by a consecutive series of punching, twisting, and stamping operations, herein described, the method of narrowing the width of the link by punching out the middle of the cross-stay and subsequently contracting the width by lateral pressure, so as to bring the stumps together to form the cross-stay, as described.

Signed by me this 23d day of July, 1889.

HIPPOLYTE RONGIER.

Witnesses:
 AMÉDÉE GOURNET,
 W. H. HARRIS.